US012658703B2

(12) United States Patent
Lu

(10) Patent No.: US 12,658,703 B2
(45) Date of Patent: Jun. 16, 2026

(54) CONTROLLING TURBO MODE OPERATION IN A POWER CONVERTER

(71) Applicant: AA Power Inc., Boston, MA (US)

(72) Inventor: Qun Lu, Lexington, MA (US)

(73) Assignee: AA Power Inc., Boston, MA (US)

( * ) Notice: Subject to any disclaimer, the term of this patent is extended or adjusted under 35 U.S.C. 154(b) by 231 days.

(21) Appl. No.: 18/605,593

(22) Filed: Mar. 14, 2024

(65) Prior Publication Data

US 2024/0348050 A1 Oct. 17, 2024

Related U.S. Application Data

(60) Provisional application No. 63/458,836, filed on Apr. 12, 2023.

(51) Int. Cl.
| | |
|---|---|
| *H02J 3/12* | (2026.01) |
| *G06Q 30/0283* | (2023.01) |
| *H02M 1/42* | (2007.01) |
| *H02M 3/158* | (2006.01) |
| *H02M 3/335* | (2006.01) |

(52) U.S. Cl.
CPC ............ *H02J 3/12* (2013.01); *G06Q 30/0283* (2013.01); *H02M 1/4225* (2013.01); *H02M 3/158* (2013.01); *H02M 3/33573* (2021.05); *H02M 3/33576* (2013.01)

(58) Field of Classification Search
CPC ......... H02M 3/33573; H02M 3/33576; H02M 3/158; H02M 1/4225; H02J 3/12; G06Q 30/0283
See application file for complete search history.

(56) References Cited

U.S. PATENT DOCUMENTS

2020/0136401 A1* 4/2020 Thompson .......... H02J 7/00304

* cited by examiner

*Primary Examiner* — Rafael O De Leon Domenech
(74) *Attorney, Agent, or Firm* — AP3 Law Firm PLLC

(57) ABSTRACT

A method includes generating a turbo mode operation instruction based on a plurality of operating conditions, based on the turbo mode operation instruction, adjusting a system limit of a power supply so as to provide excess power to a load coupled to the power supply, detecting at least one operating parameter to obtain a detected operating parameter, determining whether the detected operating parameter exceeds a predetermined threshold, and reducing the system limit of the power supply so that the detected operating parameter drops below the predetermined threshold.

22 Claims, 12 Drawing Sheets

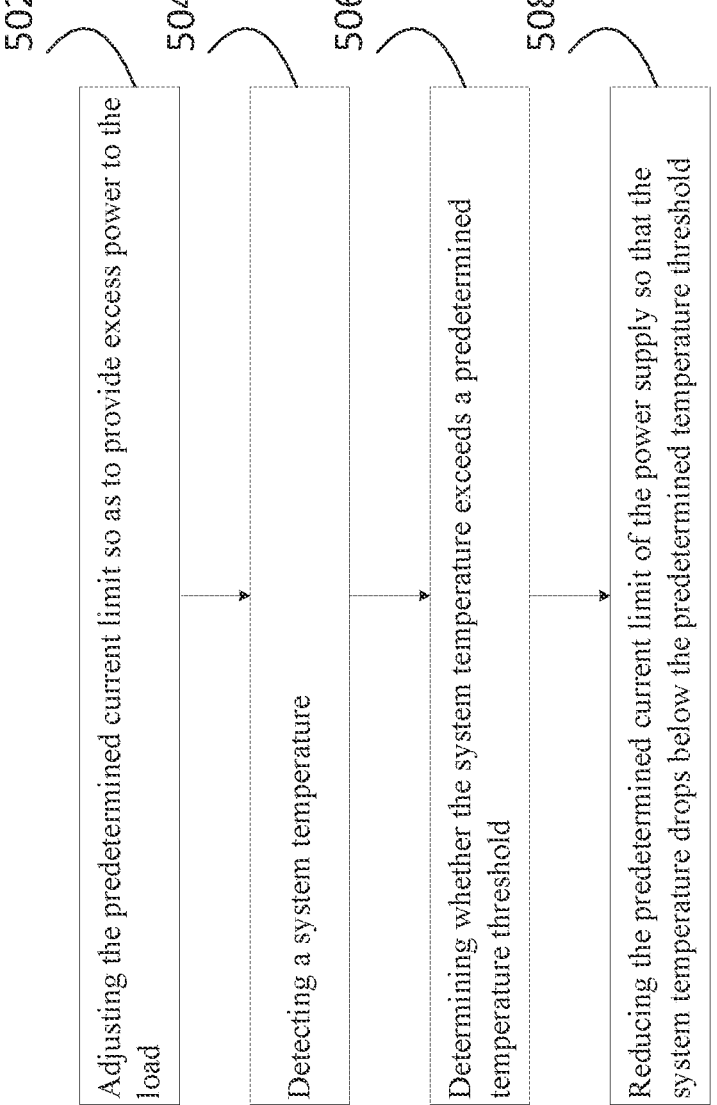

502 Adjusting the predetermined current limit so as to provide excess power to the load 504 Detecting a system temperature 506 Determining whether the system temperature exceeds a predetermined temperature threshold 508 Reducing the predetermined current limit of the power supply so that the system temperature drops below the predetermined temperature threshold

Detecting a cryptocurrency price

Determining whether the cryptocurrency price exceeds a predetermined cryptocurrency price Generating the turbo mode operation instruction once the cryptocurrency price exceeds the predetermined cryptocurrency price

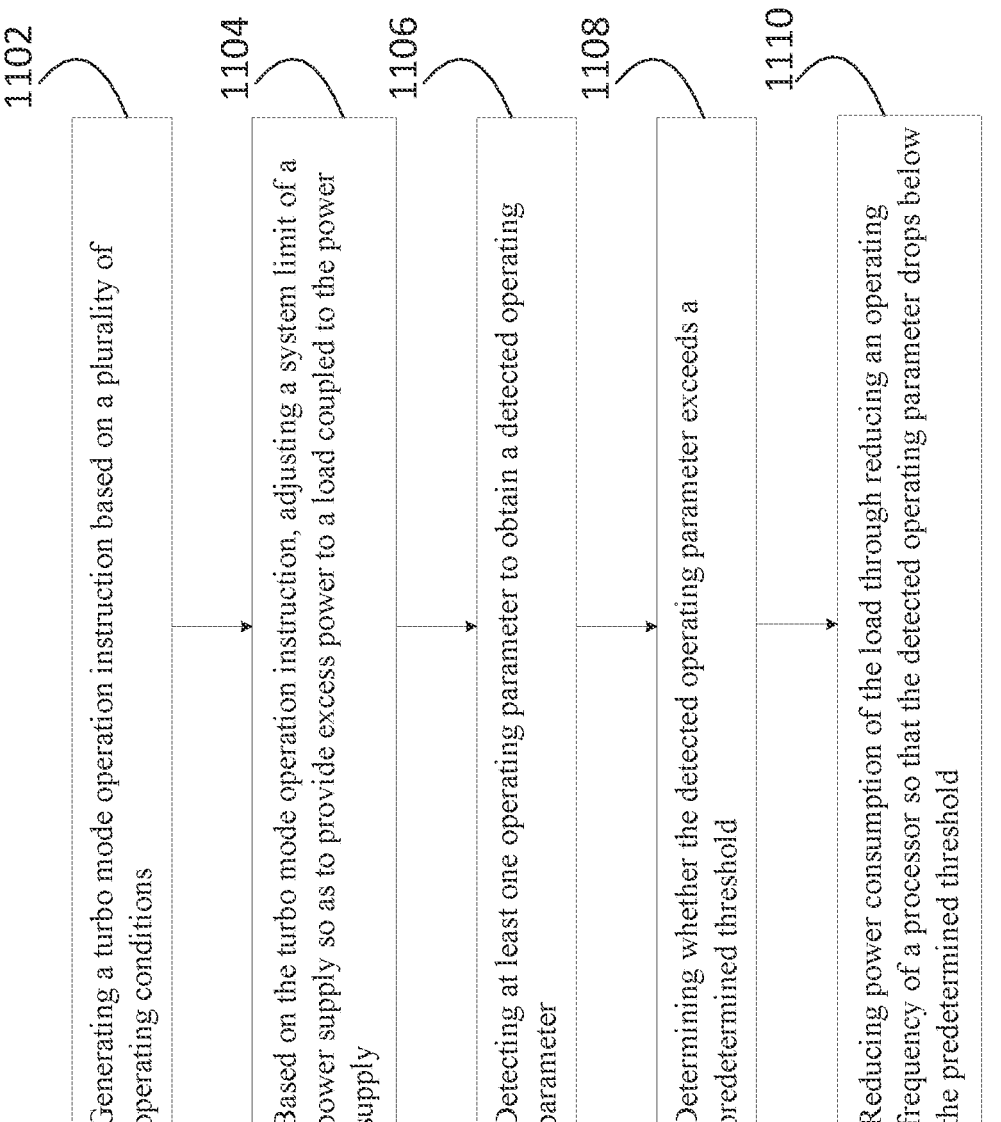

1102 Generating a turbo mode operation instruction based on a plurality of operating conditions 1104 Based on the turbo mode operation instruction, adjusting a system limit of a power supply so as to provide excess power to a load coupled to the power supply 1106 Detecting at least one operating parameter to obtain a detected operating parameter 1108 Determining whether the detected operating parameter exceeds a predetermined threshold 1110 Reducing power consumption of the load through reducing an operating frequency of a processor so that the detected operating parameter drops below the predetermined threshold

Figure 11

CONTROLLING TURBO MODE OPERATION IN A POWER CONVERTER

PRIORITY

This application claims the benefit of U.S. Provisional Application No. 63/458,836, filed on Apr. 12, 2023, entitled "Controlling Turbo Mode Operation in a Power Supply," which application is hereby incorporated herein by reference.

TECHNICAL FIELD

The present invention relates to a method for configuring a power supply to operate in a turbo mode, and, in particular embodiments, to a method for configuring the power supply in the turbo mode to provide excess power to a load connected to the power supply.

BACKGROUND

As technologies further advance, crypto mining has become one of the most computationally demanding activities. Crypto mining is the process of creating a cryptocurrency such as bitcoins. The crypto mining is performed by high-powered computers in a crypto mining farm. The crypto mining farm is essentially a data center including a plurality of high-powered computers. The high-powered computers may be also known as crypto miners. The crypto miners can be implemented as graphics processing units (GPUs) or application-specific integrated chips (ASICs).

In a crypto mining farm, a plurality of crypto miners is employed to mine together in a single location. A plurality of power supplies is connected in parallel to supply power to the plurality of crypto miners. In particular, each crypto miner is powered by a power supply. This power supply is connected between the electric grid and the crypto miner. The power supply is configured to convert the ac voltage of the electric grid into a voltage suitable for driving the crypto miner.

In the crypto mining farm, the power supplies are capable of maintaining the output voltages within a specified range for a given time period after a loss of the input power source. During the time period, the energy for supporting the output power is obtained from the hold-up capacitors.

In order to achieve a reliable power supply, a margin for safety is required in consideration with power and thermal management issues. The safety margin of the power supply may relate to power dissipation in the power supply or the voltage stress applied to the power switch with respect to the absolute maximum rating. In operation, the load may demand extra power from the power supply. The extra power may cause the power supply to operate out of the safety margin. The present disclosure addresses this need.

SUMMARY

These and other problems are generally solved or circumvented, and technical advantages are generally achieved, by preferred embodiments of the present disclosure which provide a method for configuring the power supply in the turbo mode to provide excess power to a load connected to the power supply.

In accordance with an embodiment, a method comprises generating a turbo mode operation instruction based on a plurality of operating conditions, based on the turbo mode operation instruction, adjusting a system limit of a power supply so as to provide excess power to a load coupled to the power supply, detecting at least one operating parameter to obtain a detected operating parameter, determining whether the detected operating parameter exceeds a predetermined threshold, and reducing the system limit of the power supply so that the detected operating parameter drops below the predetermined threshold.

In accordance with another embodiment, a system comprises a power supply configured to provide power to a load, and a system control apparatus configured to control the power supply, wherein the system apparatus is configured to generate a turbo mode operation instruction based on a plurality of operating conditions, based on the turbo mode operation instruction, adjust a system limit of the power supply so as to provide excess power to the load, detect at least one operating parameter to obtain a detected operating parameter, determine whether the detected operating parameter exceeds a predetermined threshold, and reduce the system limit of the power supply so that the detected operating parameter drops below the predetermined threshold.

In accordance with yet another embodiment, a method comprises generating a turbo mode operation instruction based on a plurality of operating conditions, based on the turbo mode operation instruction, adjusting a system limit of a power supply so as to provide excess power to a load coupled to the power supply, detecting at least one operating parameter to obtain a detected operating parameter, determining whether the detected operating parameter exceeds a predetermined threshold, and reducing power consumption of the load through reducing an operating frequency of a processor so that the detected operating parameter drops below the predetermined threshold.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 5 illustrates a flow chart of a second method for controlling the power supply shown in FIG. 1 in accordance with various embodiments of the present disclosure;

FIG. 11 illustrates a flow chart of a seventh method for controlling the power supply shown in FIG. 1 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for configuring a plurality of power supplies to start in a sequential manner. The disclosure may also be applied, however, to a variety of power conversion systems. Hereinafter, various embodiments will be explained in detail with reference to the accompanying drawings.

Figure 1:
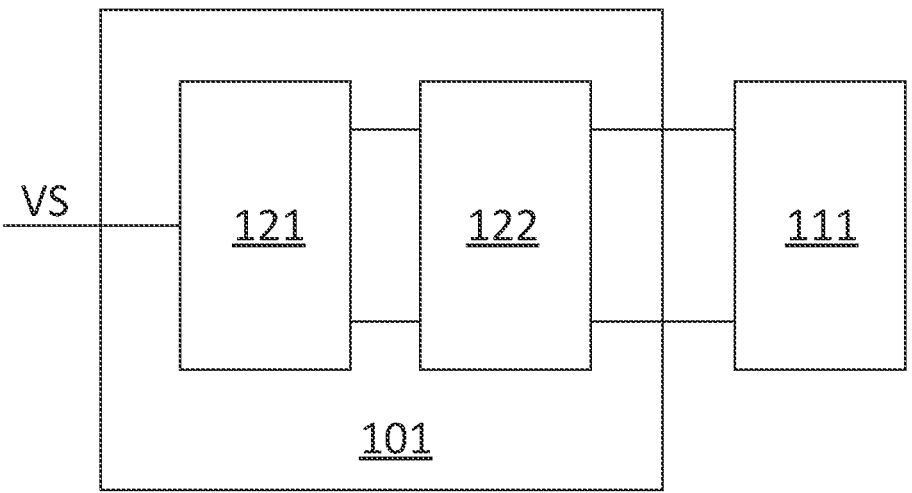
FIG. 1 illustrates a block diagram of a power supply in accordance with various embodiments of the present disclosure.

FIG. 1 illustrates a block diagram of a power supply in accordance with various embodiments of the present disclosure. The power supply 101 is coupled between an input voltage bus VS and a load 111. As shown in FIG. 1, the input of the power supply 101 is connected to the input voltage bus VS. The output of the power supply 101 is connected to the load 111.

In some embodiments, the power supply 101 comprises a first power converter 121 and a second power converter 122 connected in cascade as shown in FIG. 1. In some embodiments, the first power converter is a non-isolated power converter such as a boost converter and the like. The boost converter is configured to operate as a power factor correction stage of the power supply 101. The output capacitor of the boost converter functions as a hold-up capacitor. The second power converter 122 is an isolated dc/dc power converter such as a full-bridge converter and the like. The full-bridge converter is configured to covert the voltage across the output capacitor of the boost converter into a voltage suitable for the load 111 connected at the output of the power supply 101.

It should be noted that the full-bridge converter discussed above is merely an example, which should not unduly limit the scope of the claims. One of ordinary skill in the art would recognize many variations, alternatives, and modifications. For example, depending on different applications and design needs, the second power converter 122 may be implemented as any suitable isolated dc/dc converter such as a forward converter, a flying converter, a fly-forward converter, a half-bridge converter, an inductor-inductor-capacitor (LLC) resonant converter, any combinations thereof and the like. Alternatively, the second power converter 122 may be implemented as a non-isolated dc/dc converter such as a buck converter, a boost converter, a buck-boost converter, any combinations thereof and the like.

It should further be noted that the second power converter 122 may be formed by two power conversion stages connected in cascade. Depending on different applications and design needs, a first power conversion stage is configured to covert the voltage across the output capacitor of the boost converter into a bus voltage (e.g., 48 V or 12 V). The first power conversion stage may be implemented as an isolated dc/dc converter. The second power conversion stage is configured to covert the bus voltage into a sub-1-V processor core supply voltage (e.g., 0.6 V). The first power conversion stage may be implemented as a non-isolated dc/dc converter.

In some embodiments, the load 111 is one crypto miner or a plurality of crypto miners in a crypto farm. The crypto miner may comprise a plurality of graphics processing units (GPUs), a plurality of application-specific integrated chips (ASICs), any combinations thereof and the like. In alternative embodiments, the load 111 is one or a plurality of artificial intelligence accelerators. Each artificial intelligence accelerator has thermal design power of about 700 watts.

In some embodiments, the input voltage bus VS is coupled to a power source such as an ac power source. The power source may be generated from a power substation of the electric grid. It should be noted that the input voltage bus VS may be not coupled to the ac power source directly. Some power conversion elements such as rectifiers and filters may be coupled between the input voltage bus VS and the ac power source.

In operation, a system controller or a system control apparatus (not shown) is configured to generate a turbo mode operation instruction based on a plurality of operating conditions. Based on the turbo mode operation instruction, the system controller adjusts a system limit of the power supply 101 so as to provide excess power to the load 111. Once the system limit of the power supply 101 has been adjusted, the system controller is configured to detect at least one operating parameter to obtain a detected operating parameter. Furthermore, the system controller is configured to determine whether the detected operating parameter exceeds a predetermined threshold. If the detected operating parameter exceeds the predetermined threshold, the system controller is configured to reduce the system limit of the power supply so that the detected operating parameter drops below the predetermined threshold.

One advantageous feature of having the power supply shown in FIG. 1 is that the power supply 101 is able to provide excess power to the load in consideration with various operating conditions, thereby archiving better system performance and satisfying the power demand from the load 111.

Figure 2:
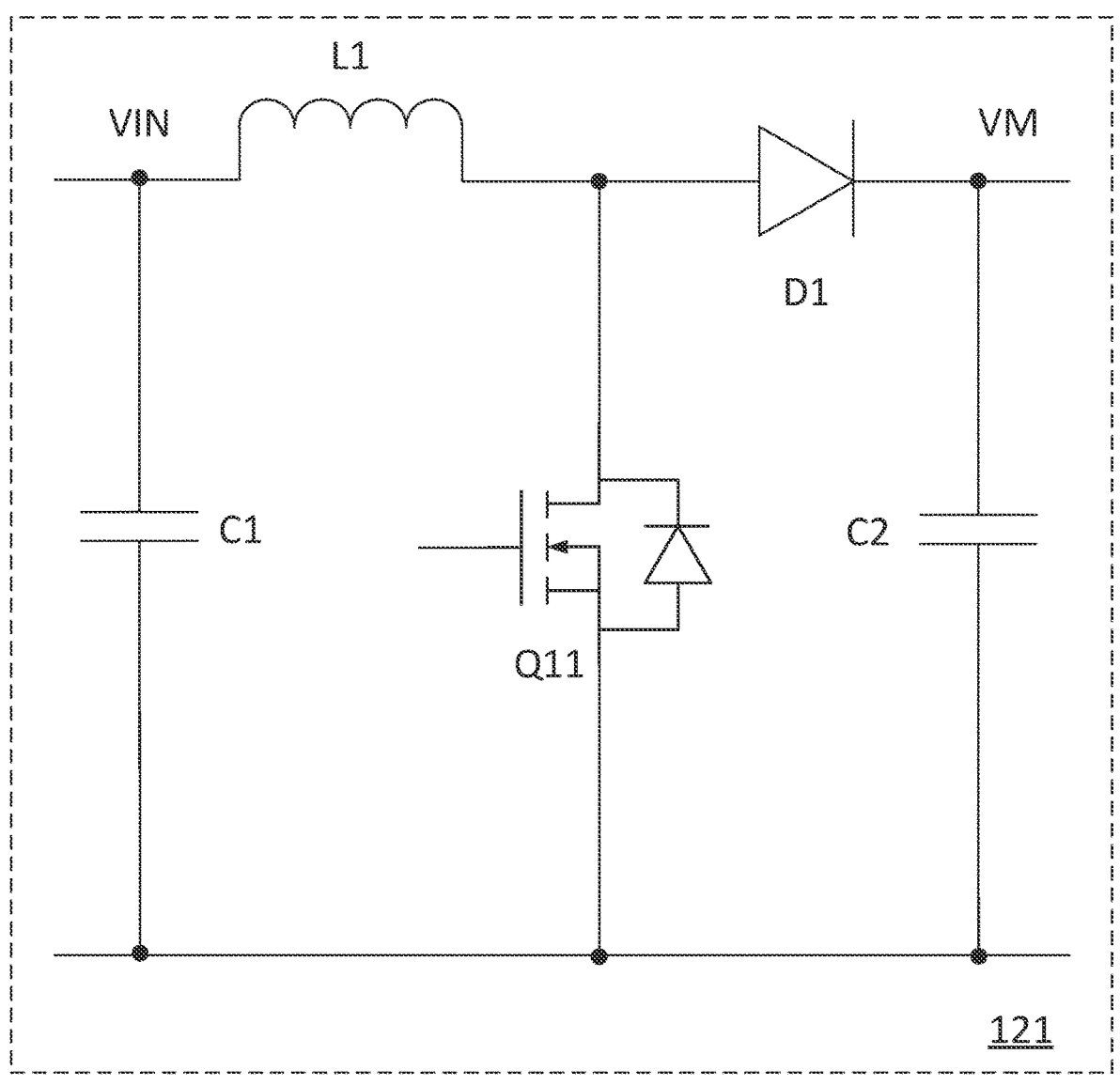
FIG. 2 illustrates a schematic diagram of the first power converter of the power supply shown in FIG. 1 in accordance with various embodiments of the present disclosure.

FIG. 2 illustrates a schematic diagram of the first power converter of the power supply shown in FIG. 1 in accordance with various embodiments of the present disclosure. In some embodiments, the first power converter 121 is implemented as a boost converter having an input terminal VIN and an output terminal VM.

As shown in FIG. 2, the boost converter comprises an input capacitor C1, an inductor L1, a switch Q11, a diode D1 and an output capacitor C2. As shown in FIG. 2, a first terminal of L1 is coupled to the input VIN of the boost converter. A second terminal of L1 is coupled to an anode of the diode D1. The switch Q11 is coupled between a common node of L1 and the diode D1, and ground. The output capacitor C2 is coupled between a cathode of the diode D1 and ground. The output capacitor C2 functions as a hold-up capacitor for the power supply 101. The operating principle of the boost converter is well known in the art, and hence is not discussed herein to avoid repetition.

In accordance with an embodiment, the switch of FIG. 2 (e.g., switch Q11) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like. Furthermore, the switch shown in FIG. 2 may be implemented as a plurality of switches connected in parallel. Moreover, a capacitor may be connected in parallel with the switch to achieve zero voltage switching (ZVS)/zero current switching (ZCS).

It should be noted that depending on different applications and design needs, the diode D1 may be replaced by one or a plurality of power switches connected in parallel to further improve the efficiency of the first power converter.

Figure 3:
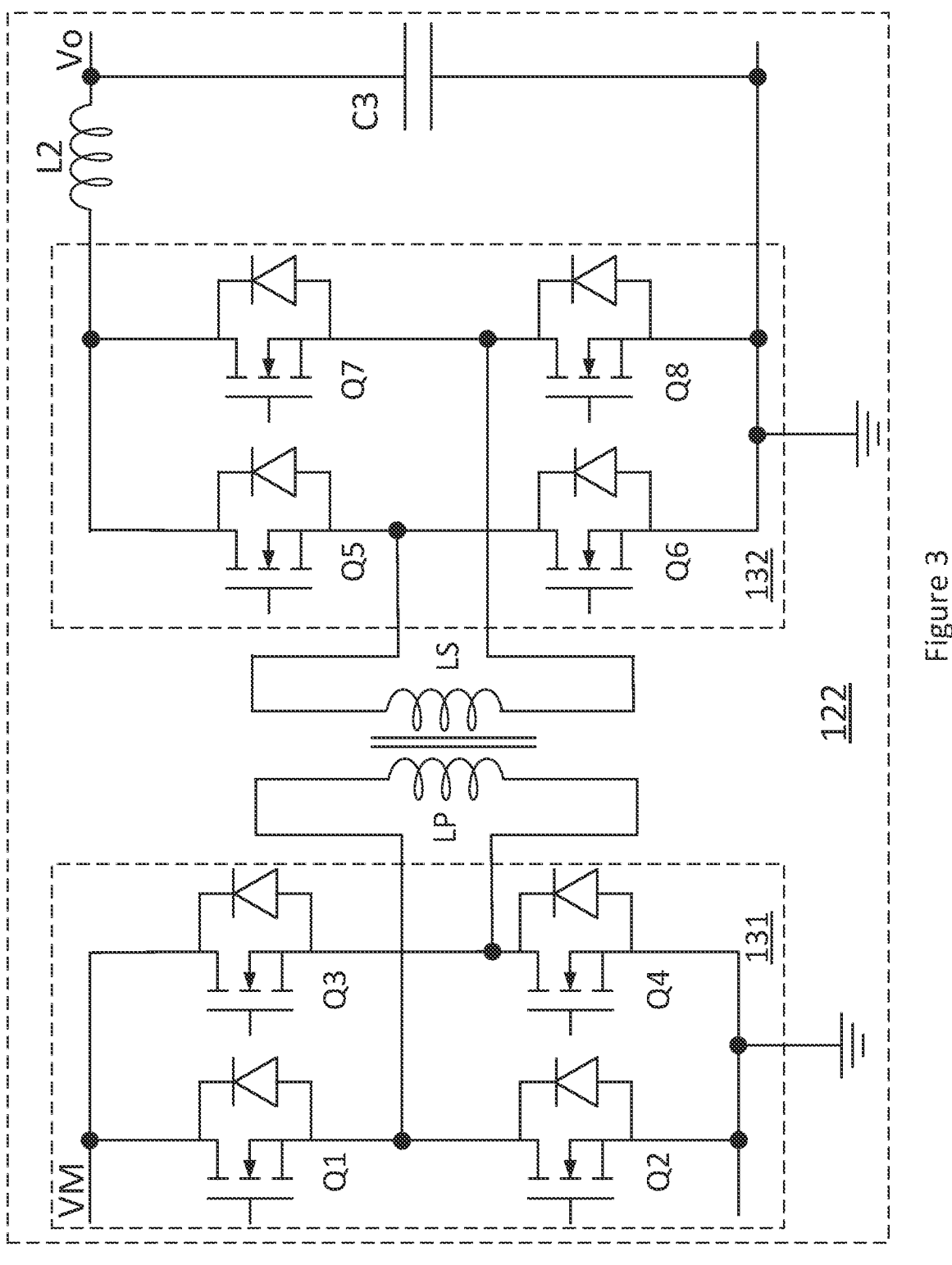
FIG. 3 illustrates a schematic diagram of the second power converter of the power supply shown in FIG. 1 in accordance with various embodiments of the present disclosure.

FIG. 3 illustrates a schematic diagram of the second power converter of the power supply shown in FIG. 1 in accordance with various embodiments of the present disclosure. In some embodiments, the second power converter 122 is implemented as a full-bridge converter having an input terminal VM and an output terminal Vo.

The primary side circuit of the full-bridge converter comprises a first switch Q1 and a second switch Q2, a third switch Q3 and a fourth switch Q4. As shown in FIG. 3, the first switch Q1 and the second switch Q2 are connected in series between a first voltage bus and a second voltage bus. The third switch Q3 and the fourth switch Q4 are connected in series between the first voltage bus and the second voltage bus. The first voltage bus is coupled to the input terminal VM, which is the output of the boost converter. The second voltage bus is connected to ground.

A common node of the first switch Q1 and the second switch Q2 is connected to a first terminal of the primary winding LP of the transformer of the full-bridge converter. A common node of the third switch Q3 and the fourth switch Q4 is connected to a second terminal of the primary winding LP of the transformer of the full-bridge converter.

The secondary side circuit of the full-bridge converter comprises a rectifier 132 and a filter connected in cascade between the secondary winding LS of the transformer and the load. The rectifier 132 comprises a fifth switch Q5, a sixth switch Q6, a seventh switch Q7 and an eighth switch Q8. The filter comprises an inductor L2 and an output capacitor C3.

As shown in FIG. 3, the fifth switch Q5 and the sixth switch Q6 are connected in series between a third voltage bus and a fourth voltage bus. The seventh switch Q7 and the eighth switch Q8 are connected in series between the third voltage bus and the fourth voltage bus. The third voltage bus is coupled to the input of the filter. The fourth voltage bus is connected to ground.

A common node of the fifth switch Q5 and the sixth switch Q6 is connected to a first terminal of the second winding LS of the transformer of the full-bridge converter. A common node of the seventh switch Q7 and the eighth switch Q8 is connected to a second terminal of the second winding LS of the transformer of the full-bridge converter. The inductor L2 of the filter is connected between the third voltage bus and the output terminal Vo. The output capacitor C2 is connected between the output terminal Vo and ground.

It should be noted that the transformer structure shown in FIG. 3 is merely an example. One person skilled in the art will recognize many alternatives, variations and modification. For example, the secondary side of the transformer may be a center tapped transformer winding. As a result, the secondary side may employ a synchronous rectifier formed by two switching elements. The operation principle of a synchronous rectifier coupled to a center tapped transformer winding is well known, and hence is not discussed in further detail herein to avoid repetition.

It should further be noted that the power topology of the full-bridge converter may be not only applied to the rectifier as shown in FIG. 3, but also applied to other secondary configurations, such as voltage doubler rectifiers, current doubler rectifiers, any combinations thereof and/or the like.

It should be noted that the diagram shown in FIG. 3 is merely an example, which should not unduly limit the scope of the claims. One of ordinary skill in the art would recognize many variations, alternatives, and modifications. For example, switches Q5-Q8 may be replaced by diodes to simplify the control of the rectifier 132.

In accordance with an embodiment, the switches of FIG. 3 (e.g., switches Q1-Q8) may be metal oxide semiconductor field-effect transistor (MOSFET) devices, bipolar junction transistor (BJT) devices, super junction transistor (SJT) devices, insulated gate bipolar transistor (IGBT) devices, gallium nitride (GaN) based power devices and/or the like.

It should be noted while FIG. 3 shows the switches are implemented as single n-type transistors, a person skilled in the art would recognize there may be many variations, modifications and alternatives. For example, depending on different applications and design needs, at least some of the switches may be implemented as p-type transistors. Furthermore, each switch shown in FIG. 3 may be implemented as a plurality of switches connected in parallel. Moreover, a capacitor may be connected in parallel with one switch to achieve zero voltage switching (ZVS)/zero current switching (ZCS).

In some embodiments, the transformer and the inductor shown in FIG. 3 are formed by an integrated magnetic apparatus. In particular, the integrated magnetic apparatus comprises a first integrated magnetic core, a second integrated magnetic core and a plurality of windings. The second integrated magnetic core is over the first integrated magnetic core. One of the first integrated magnetic core and the second integrated magnetic core comprises a plurality of legs. The plurality of windings is around the plurality of legs. In some embodiments, the windings of the transformer are around two outer legs of the plurality of legs. The winding of the inductor is around one middle leg of the plurality of legs.

Figure 4:
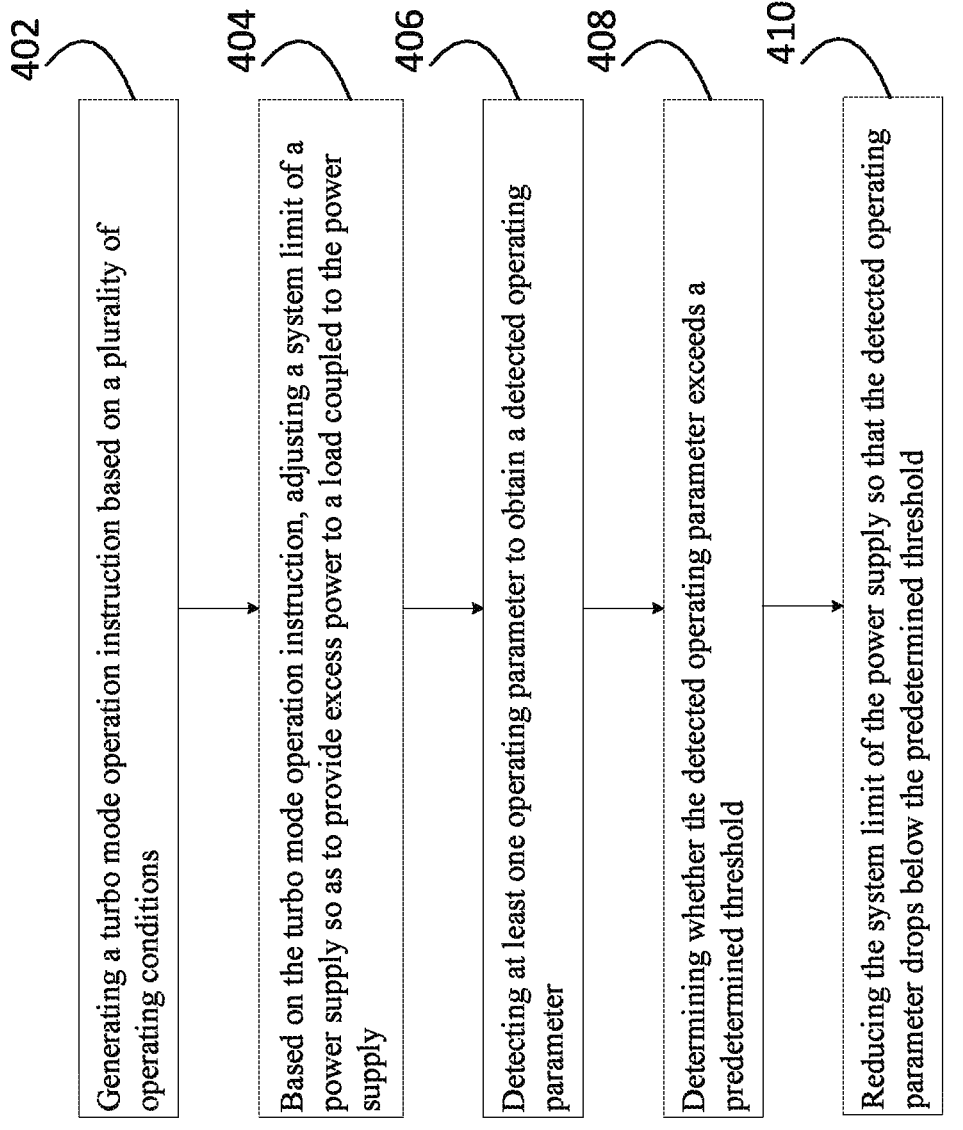
FIG. 4 illustrates a flow chart of a first method for controlling the power supply shown in FIG. 1 in accordance with various embodiments of the present disclosure.

FIG. 4 illustrates a flow chart of a first method for controlling the power supply shown in FIG. 1 in accordance with various embodiments of the present disclosure. This flowchart shown in FIG. 4 is merely an example, which should not unduly limit the scope of the claims. One of ordinary skill in the art would recognize many variations, alternatives, and modifications. For example, various steps illustrated in FIG. 4 may be added, removed, replaced, rearranged and repeated.

Referring back to FIG. 1, a power supply 101 is coupled between a power source VS and a load 111. The power supply 101 is configured to provide power to the load 111. The power supply 101 comprises a first power converter 121 and a second power converter 122 connected in cascade. In order to provide excess power to the load 111, the power supply 101 is configured to operate in a turbo mode.

In the turbo mode, the design and reliability margins are temporarily ignored, and the power supply 101 operates in a region out of specification limits. In other words, some operating parameters (e.g., the temperature limit, the current limit, the voltage limit) exceeds the specification limit. The power supply operates outside the specification range. As a result, the power supply is able to deliver more power to the load. In order to provide more power to the load, the method for controlling the power supply includes the following steps.

At step 402, a turbo mode operation instruction is generated based on a plurality of operating conditions.

At step 404, based on the turbo mode operation instruction, a system limit of a power supply is adjusted so as to provide excess power to a load coupled to the power supply.

At step 406, at least one operating parameter is detected to obtain a detected operating parameter.

At step 408, a controller determines whether the detected operating parameter exceeds a predetermined threshold.

At step 410, if the detected operating parameter exceeds the predetermined threshold, the system limit of the power supply is reduced so that the detected operating parameter drops below the predetermined threshold.

In operation, once the detected operating parameter drops below the predetermined threshold, the system limit of the power supply is increased so as to provide excess power to the load.

In some embodiments, the system limit is a predetermined current limit. The predetermined current limit is dynamically adjustable in response to the turbo mode operation instruction and the detected operating parameter.

In some embodiments, the system limit is a predetermined temperature limit. The predetermined temperature limit is dynamically adjustable in response to the turbo mode operation instruction and the detected operating parameter.

In some embodiments, the system limit is a predetermined voltage limit across one power switch of the power supply. The predetermined voltage limit across the one power switch of the power supply is dynamically adjustable in response to the turbo mode operation instruction and the detected operating parameter.

In some embodiments, the system limit is a predetermined voltage limit across a hold-up capacitor of the power supply. The predetermined voltage limit across the hold-up capacitor of the power supply is dynamically adjustable in response to the turbo mode operation instruction and the detected operating parameter.

In some embodiments, the system limit is a predetermined magnetic flux density saturation limit of the power supply. The predetermined magnetic flux density saturation limit is dynamically adjustable in response to the turbo mode operation instruction and the detected operating parameter.

In some embodiments, the system limit is a combination of a predetermined current limit, a predetermined temperature limit, a predetermined voltage limit across one power switch of the power supply, a predetermined voltage limit across a hold-up capacitor of the power supply and a predetermined magnetic flux density saturation limit of the power supply. The system limit is dynamically adjustable in response to the turbo mode operation instruction and the detected operating parameter.

In some embodiments, the system limit is a combination of a predetermined current limit, a predetermined temperature limit, a predetermined voltage limit across one power switch of the power supply, a predetermined voltage limit across a hold-up capacitor of the power supply and a predetermined magnetic flux density saturation limit of the power supply. In response to the turbo mode operation instruction and the detected operating parameter, the predetermined current limit, the predetermined temperature limit, the predetermined voltage limit across the one power switch of the power supply, the predetermined voltage limit across the hold-up capacitor of the power supply and the predetermined magnetic flux density saturation limit of the power supply are dynamically adjusted in a sequential manner.

FIG. 5 illustrates a flow chart of a second method for controlling the power supply shown in FIG. 1 in accordance with various embodiments of the present disclosure. This flowchart shown in FIG. 5 is merely an example, which should not unduly limit the scope of the claims. One of ordinary skill in the art would recognize many variations, alternatives, and modifications. For example, various steps illustrated in FIG. 5 may be added, removed, replaced, rearranged and repeated.

In operation, a turbo mode operation instruction is generated based on a plurality of operating conditions. Based on the turbo mode operation instruction, a system limit of a power supply is adjusted so as to provide excess power to a load coupled to the power supply. In some embodiments, the system limit is a predetermined current limit. Under this system limit, the method for controlling the power supply includes the following steps.

At step 502, the predetermined current limit is adjusted so as to provide excess power to the load.

At step 504, a system temperature is detected.

At step 506, a controller determines whether the system temperature exceeds a predetermined temperature threshold.

At step 508, if the system temperature exceeds the predetermined temperature threshold, the predetermined current limit of the power supply is reduced so that the system temperature drops below the predetermined temperature threshold.

In operation, once the system temperature drops below the predetermined temperature threshold, the predetermined current limit of the power supply is increased so as to provide excess power to the load.

Figure 6:
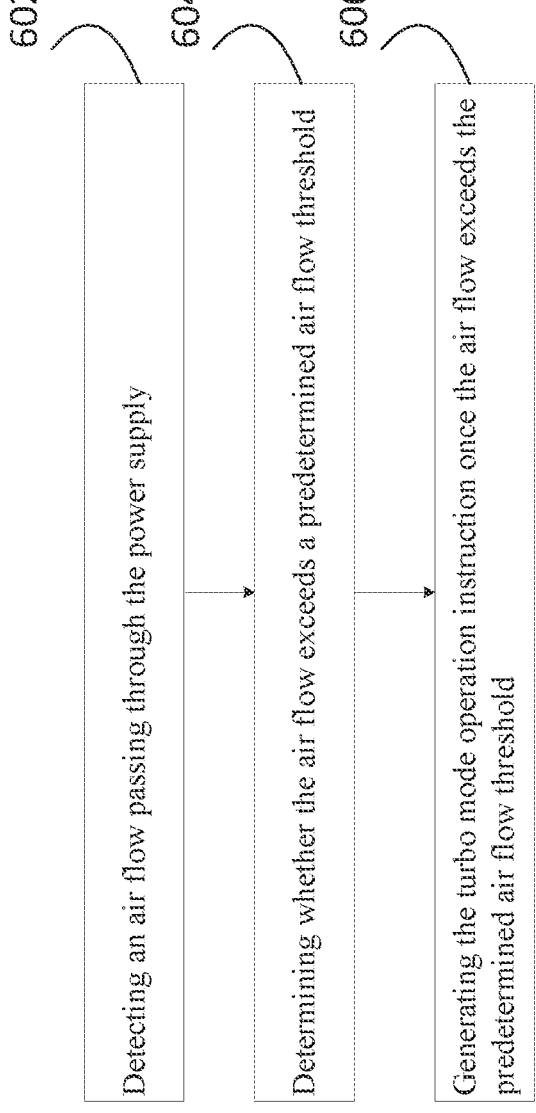
FIG. 6 illustrates a flow chart of a third method for controlling the power supply shown in FIG. 1 in accordance with various embodiments of the present disclosure.

FIG. 6 illustrates a flow chart of a third method for controlling the power supply shown in FIG. 1 in accordance with various embodiments of the present disclosure. This flowchart shown in FIG. 6 is merely an example, which should not unduly limit the scope of the claims. One of ordinary skill in the art would recognize many variations, alternatives, and modifications. For example, various steps illustrated in FIG. 6 may be added, removed, replaced, rearranged and repeated.

In operation, a turbo mode operation instruction is generated based on a plurality of operating conditions. In some embodiments, the turbo mode operation instruction is generated based on the air flow passing through the power supply. Under this operating condition, the method for controlling the power supply includes the following steps.

At step 602, an air flow passing through the power supply is detected.

At step 604, a controller determines whether the air flow exceeds a predetermined air flow threshold.

At step 606, the turbo mode operation instruction is generated once the air flow exceeds the predetermined air flow threshold.

In the turbo mode, the predetermined current limit of the power supply is adjusted so as to provide excess power to the load. In some embodiments, the predetermined current limit is dynamically adjustable based on the speed of the air flow. The increase of the current limit is proportional to the increase of the speed of the air flow. For example, the air flow is equal to 120% of the predetermined air flow threshold. In response to this air flow, the current limit of the power supply is adjusted to 120% of the current limit in the specification.

Figure 7:
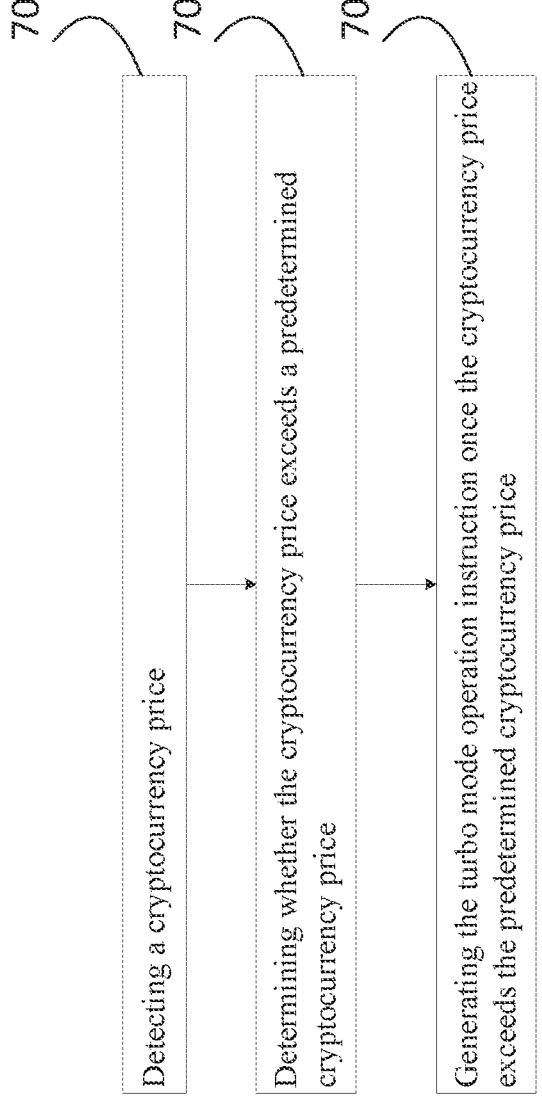
FIG. 7 illustrates a flow chart of a fourth method for controlling the power supply shown in FIG. 1 in accordance with various embodiments of the present disclosure.

FIG. 7 illustrates a flow chart of a fourth method for controlling the power supply shown in FIG. 1 in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

In operation, a turbo mode operation instruction is generated based on a plurality of operating conditions. In some embodiments, the turbo mode operation instruction is generated based on the cryptocurrency price. Under this operating condition, the method for controlling the power supply includes the following steps.

At step 702, a cryptocurrency price is monitored.

At step 704, a controller determines whether the cryptocurrency price exceeds a predetermined cryptocurrency price.

At step 706, the turbo mode operation instruction is generated once the cryptocurrency price exceeds the predetermined cryptocurrency price.

In this turbo mode, the predetermined current limit of the power supply is adjusted so as to provide excess power to the load. In some embodiments, the predetermined current limit is dynamically adjustable based on the cryptocurrency price. The increase of the current limit is proportional to the increase of the cryptocurrency price.

Figure 8:
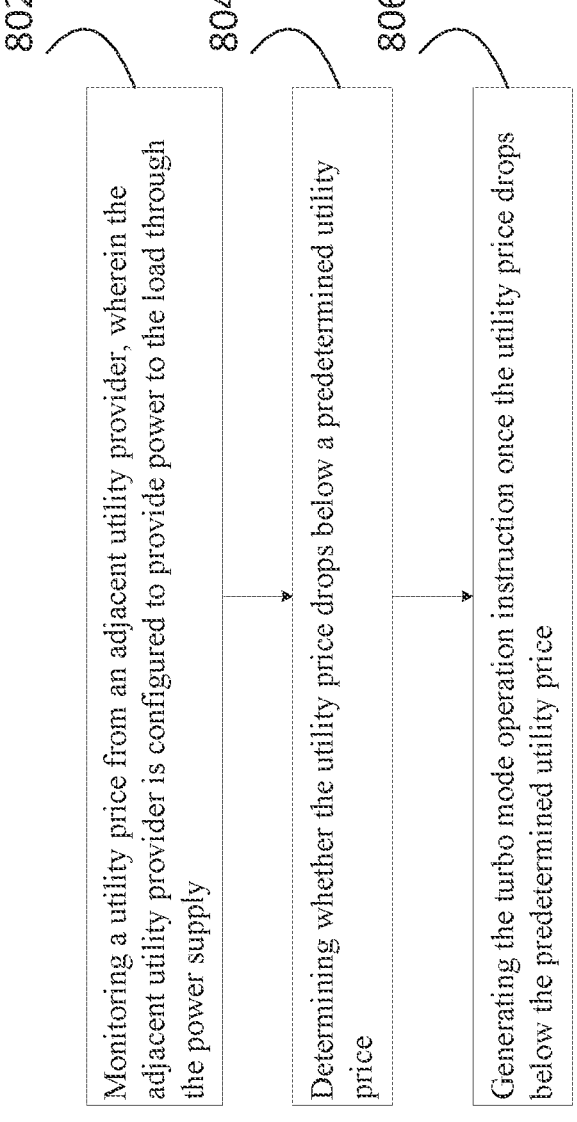
FIG. 8 illustrates a flow chart of a fifth method for controlling the power supply shown in FIG. 1 in accordance with various embodiments of the present disclosure.

FIG. 8 illustrates a flow chart of a fifth method for controlling the power supply shown in FIG. 1 in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

In operation, a turbo mode operation instruction is generated based on a plurality of operating conditions. In some embodiments, the turbo mode operation instruction is generated based on the utility price. Under this operating condition, the method for controlling the power supply includes the following steps.

At step 802, a utility price from an adjacent utility provider is monitored. The adjacent utility provider is configured to provide power to the load through the power supply.

At step 804, a controller determines whether the utility price drops below a predetermined utility price.

At step 806, the turbo mode operation instruction is generated once the utility price drops below the predetermined utility price.

In the turbo mode, the predetermined current limit of the power supply is adjusted so as to provide excess power to the load. In some embodiments, the predetermined current limit is dynamically adjustable based on the utility price. The increase of the current limit is proportional to the cost change of the utility. Increasing the current limit might impact the longevity of the power supply. If the cost savings from the utility outweigh the reduction in the lifespan of the power supply, the power supply will be configured to operate in the turbo mode.

Figure 9:
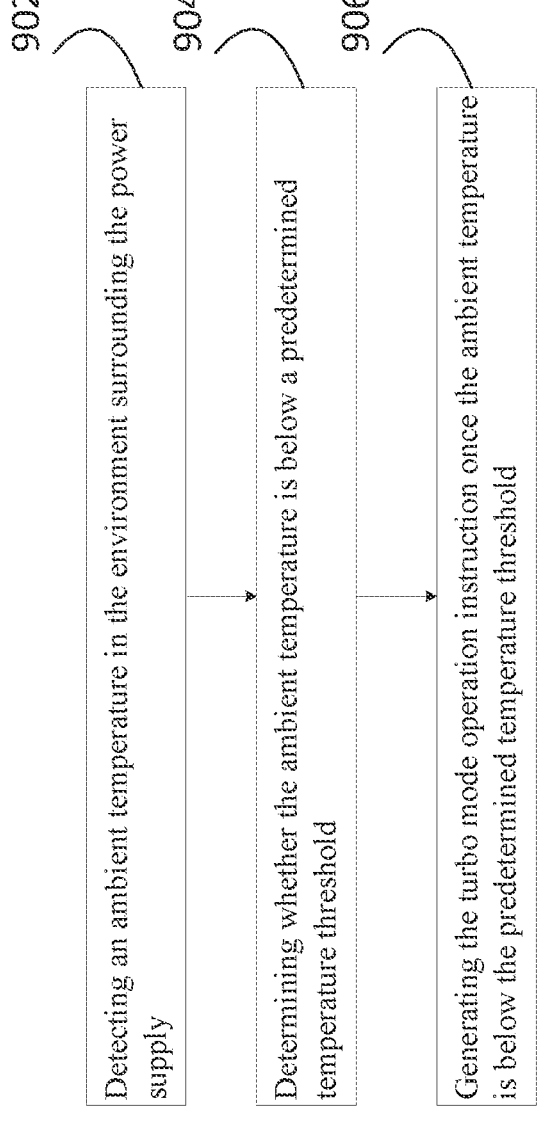
FIG. 9 illustrates a flow chart of a sixth method for controlling the power supply shown in FIG. 1 in accordance with various embodiments of the present disclosure.

FIG. 9 illustrates a flow chart of a sixth method for controlling the power supply shown in FIG. 1 in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

In operation, a turbo mode operation instruction is generated based on a plurality of operating conditions. In some embodiments, the turbo mode operation instruction is generated based on the ambient temperature in the environment surrounding the power supply. For example, some regions are known for their harsh cold climate. In these regions, the power supply can reliably operate in the turbo mode to provide more power to the load. Under this operating condition (harsh cold climate), the method for controlling the power supply includes the following steps.

At step 902, the ambient temperature in the environment surrounding the power supply is detected.

At step 904, a controller determines whether the ambient temperature is below a predetermined temperature threshold.

At step 906, the turbo mode operation instruction is generated once the ambient temperature is below the predetermined temperature threshold.

In the turbo mode, the predetermined current limit of the power supply is adjusted so as to provide excess power to the load. In some embodiments, the predetermined current limit is dynamically adjustable based on the ambient temperature. The increase of the current limit is proportional to the decrease of the ambient temperature.

Figure 10:
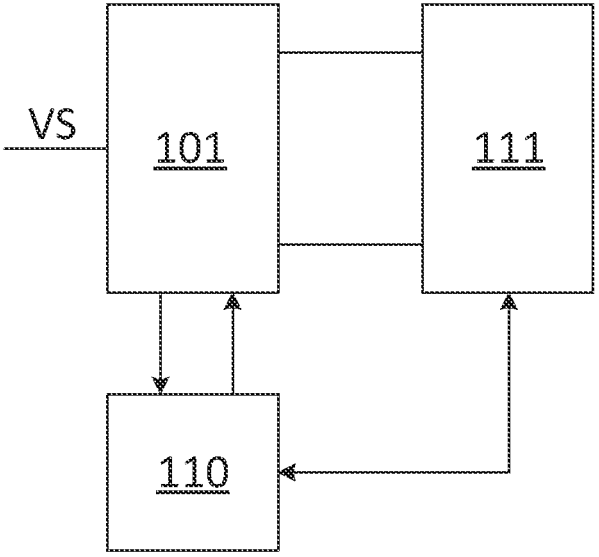
FIG. 10 illustrates a block diagram of the power supply and the associated control circuit in accordance with various embodiments of the present disclosure.

FIG. 10 illustrates a block diagram of the power supply and the associated control circuit in accordance with various embodiments of the present disclosure. The power supply 101 is coupled between an input voltage bus VS and a load 111. As shown in FIG. 10, the input of the power supply 101 is connected to the input voltage bus VS. The output of the power supply 101 is connected to the load 111.

A control circuit 110 is coupled to the power supply 101 and the load 111. The control circuit 110 may be a system controller or a system control apparatus. The control circuit 110 may be implemented as a microprocessor, a digital signal processor and the like.

As shown in FIG. 10, the control circuit 110 is configured to receive a plurality of operating parameters (e.g., the current flowing through the power supply, the input voltage, the output voltage, the temperature of the power switch and the like). Based on the received operating parameters, the control circuit 110 is able to determine various operating conditions of the power supply 101. Furthermore, the control circuit 110 is configured to generate a turbo mode operation instruction based on a plurality of operating conditions, and feed the turbo mode operation instruction into the power supply 101. Based on the turbo mode operation instruction, a system limit of the power supply (e.g., the current limit) is adjusted so as to provide excess power to the load 111.

Once the system limit has been adjusted, the control circuit 110 is able to detect at least one operating parameter (e.g., the temperature of the power supply) to obtain a detected operating parameter. Furthermore, the control circuit 110 is able to determine whether the detected operating parameter exceeds a predetermined threshold. If the detected operating parameter exceeds the predetermined threshold, the control circuit 110 configures the power supply 101 to reduce the system limit so that the detected operating parameter drops below the predetermined threshold.

In some embodiments, the load 111 is one or a plurality of artificial intelligence accelerators. As shown in FIG. 10, the control circuit 110 is able to communicate with the load 111. In operation, the control circuit 110 configures the power supply 101 to operate in the turbo mode. If the detected operating parameter (e.g., the temperature of the power supply) exceeds the predetermined threshold, the control circuit 110 may configure the power supply 101 to reduce the system limit so as to reduce the temperature of the power supply. On the other hand, the control circuit 110 is able to inform the load 111 that the detected operating parameter (e.g., the temperature of the power supply) exceeds the predetermined temperature threshold. The load 111 has a plurality of processors and system control circuits. Based on the information sent from the control circuit 110, the processor and/or the system control circuit in the load 111 can reduce the power consumption of the load 111 through reducing the operating frequency of the processors. The reduced operating frequency helps to reduce the power demand from the load 111. In response to the reduced power demand from the load 111, the detected operating parameter (e.g., the temperature of the power supply) drops below the predetermined temperature threshold.

FIG. 11 illustrates a flow chart of a seventh method for controlling the power supply shown in FIG. 1 in accordance with various embodiments of the present disclosure. This flowchart shown in FIG. 11 is merely an example, which should not unduly limit the scope of the claims. One of ordinary skill in the art would recognize many variations, alternatives, and modifications. For example, various steps illustrated in FIG. 11 may be added, removed, replaced, rearranged and repeated.

Referring back to FIG. 10, a power supply 101 is coupled between a power source VS and a load 111. The power supply 101 is configured to provide power to the load 111. In order to provide excess power to the load 111, the power supply 101 is configured to operate in a turbo mode. A control circuit 110 is coupled to the power supply 101 and the load 111.

In the turbo mode, the design and reliability margins are temporarily ignored and the power supply 101 operates in a region out of specification limits. In other words, some operating parameters (e.g., the temperature limit, the current limit, the voltage limit) exceeds the specification limit. The power supply operates outside the specification range. As a result, the power supply is able to deliver more power to the load. In order to provide more power to the load, the method for controlling the power supply includes the following steps.

At step 1102, a turbo mode operation instruction is generated based on a plurality of operating conditions.

At step 1104, based on the turbo mode operation instruction, a system limit of a power supply is adjusted so as to provide excess power to a load coupled to the power supply.

At step 1106, at least one operating parameter is detected to obtain a detected operating parameter.

At step 1108, a controller (e.g., control circuit 110) determines whether the detected operating parameter exceeds a predetermined threshold.

At step 1110, if the detected operating parameter exceeds the predetermined threshold, the controller informs the load about this. In response to the information sent from the controller, the power consumption of the load is reduced through reducing an operating frequency of a processor. Once the power consumption is reduced, the detected operating parameter drops below the predetermined threshold.

In some embodiments, the controller and the load can coordinate so that reducing the system limit and reducing the power consumption of the load can be carried out in an alternating manner. As a result, the power supply is able to provide maximum power to the load in a predetermined time period.

Figure 12:
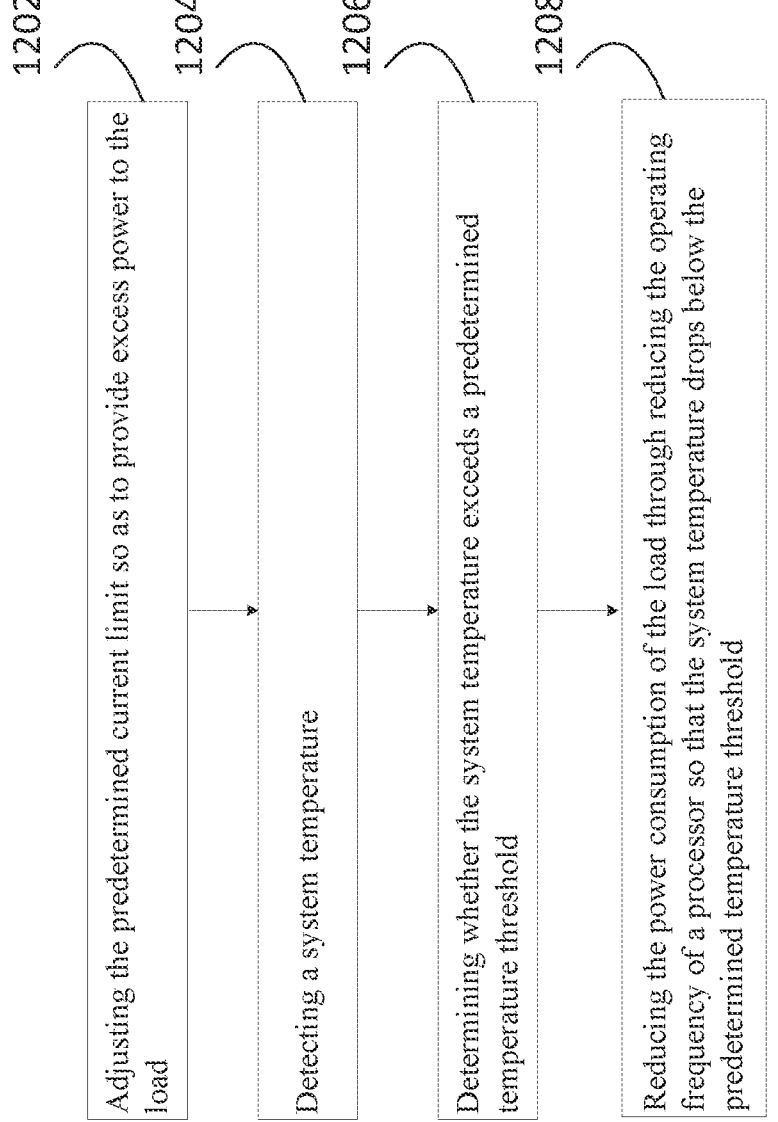
FIG. 12 illustrates a flow chart of an eighth method for controlling the power supply shown in FIG. 1 in accordance with various embodiments of the present disclosure.

FIG. 12 illustrates a flow chart of an eighth method for controlling the power supply shown in FIG. 1 in accordance with various embodiments of the present disclosure. This flowchart shown in FIG. 12 is merely an example, which should not unduly limit the scope of the claims. One of ordinary skill in the art would recognize many variations, alternatives, and modifications. For example, various steps illustrated in FIG. 12 may be added, removed, replaced, rearranged and repeated.

In operation, a turbo mode operation instruction is generated based on a plurality of operating conditions. Based on the turbo mode operation instruction, a system limit of a power supply is adjusted so as to provide excess power to a load coupled to the power supply. In some embodiments, the system limit is a predetermined current limit. Under this system limit, the method for controlling the power supply includes the following steps.

At step 1202, the predetermined current limit is adjusted so as to provide excess power to the load.

At step 1204, a system temperature is detected.

At step 1206, a controller (e.g., control circuit 110) determines whether the system temperature exceeds a predetermined temperature threshold.

At step 1208, if the system temperature exceeds a predetermined temperature threshold, the controller informs the load about this. In response to the information sent from the controller, the power consumption of the load is reduced through reducing an operating frequency of a processor. Once the power consumption is reduced, the system temperature drops below the predetermined temperature threshold.

In some embodiments, the controller and the load can coordinate so that reducing the predetermined current limit and reducing the power consumption of the load can be carried out in an alternating manner. As a result, the power supply is able to provide maximum power to the load in a predetermined time period.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:

generating a turbo mode operation instruction based on a plurality of operating conditions;

based on the turbo mode operation instruction, adjusting a system limit of a power supply so as to provide excess power to a load coupled to the power supply, wherein the power supply comprises a non-isolated power factor correction device and an isolated dc/dc converter connected in cascade between a power source and the load;

detecting at least one operating parameter to obtain a detected operating parameter;

determining whether the detected operating parameter exceeds a predetermined threshold; and reducing the system limit of the power supply so that the detected operating parameter drops below the predetermined threshold.

2. The method of claim 1, wherein:

the load comprises a crypto mining machine.

3. The method of claim 1, wherein:

the non-isolated power factor correction device is a boost converter; and the isolated dc/dc converter is a full-bridge converter.

4. The method of claim 3, wherein:

the boost converter comprises an input capacitor, an inductor, a switch, a diode and an output capacitor, and wherein:

the input capacitor is coupled between a first input and a second input of the boost converter;

a first terminal of the inductor is coupled to the first input of the boost converter;

a second terminal of the inductor is coupled to an anode of the diode;

the switch is coupled between a common node of the inductor and the diode, and the second input of the boost converter; and the output capacitor is coupled between a cathode of the diode and the second input of the boost converter;

a primary side circuit of the full-bridge converter comprises a first switch, a second switch, a third switch and a fourth switch, and wherein:

the first switch and the second switch are connected in series between a first input and a second input of the full-bridge converter, and wherein a common node of the first switch and the second switch is connected to a first terminal of a primary winding of a transformer of the full-bridge converter;

the third switch and the fourth switch are connected in series between the first input and the second input of the full-bridge converter, and wherein a common node of the third switch and the fourth switch is connected to a second terminal of the primary winding of the transformer of the full-bridge converter; and a secondary side circuit of the full-bridge converter comprises a rectifier and a filter connected in cascade between a secondary winding of the transformer of the full-bridge converter and an output of the full-bridge converter.

5. The method of claim 1, wherein:

the system limit is a predetermined current limit, and wherein the predetermined current limit is dynamically adjustable in response to the turbo mode operation instruction and the detected operating parameter.

6. The method of claim 5, further comprising:

adjusting the predetermined current limit so as to provide excess power to the load;

detecting a system temperature;

determining whether the system temperature exceeds a predetermined temperature threshold; and reducing the predetermined current limit of the power supply so that the system temperature drops below the predetermined threshold.

7. The method of claim 1, wherein:

the system limit is a predetermined temperature limit, and wherein the predetermined temperature limit is dynamically adjustable in response to the turbo mode operation instruction and the detected operating parameter.

8. The method of claim 1, wherein:

the system limit is a predetermined voltage limit across one power switch of the power supply, and wherein the predetermined voltage limit across the one power switch of the power supply is dynamically adjustable in response to the turbo mode operation instruction and the detected operating parameter.

9. The method of claim 1, wherein:

the system limit is a predetermined voltage limit across a hold-up capacitor of the power supply, and wherein the predetermined voltage limit across the hold-up capacitor of the power supply is dynamically adjustable in response to the turbo mode operation instruction and the detected operating parameter.

10. The method of claim 1, wherein:

the system limit is a predetermined magnetic flux density saturation limit of the power supply, and wherein the predetermined magnetic flux density saturation limit is dynamically adjustable in response to the turbo mode operation instruction and the detected operating parameter.

11. The method of claim 1, wherein:

the system limit is a combination of a predetermined current limit, a predetermined temperature limit, a predetermined voltage limit across one power switch of the power supply, a predetermined voltage limit across a hold-up capacitor of the power supply and a predetermined magnetic flux density saturation limit of the power supply, and wherein the system limit is dynamically adjustable in response to the turbo mode operation instruction and the detected operating parameter.

12. The method of claim 1, wherein:

the system limit is a combination of a predetermined current limit, a predetermined temperature limit, a predetermined voltage limit across one power switch of the power supply, a predetermined voltage limit across a hold-up capacitor of the power supply and a predetermined magnetic flux density saturation limit of the power supply, and wherein in response to the turbo mode operation instruction and the detected operating parameter, the predetermined current limit, the predetermined temperature limit, the predetermined voltage limit across the one power switch of the power supply, the predetermined voltage limit across the hold-up capacitor of the power supply and the predetermined magnetic flux density saturation limit of the power supply are dynamically adjusted in a sequential manner.

13. The method of claim 1, further comprising:

detecting an air flow passing through the power supply;

determining whether the air flow exceeds a predetermined air flow threshold; and generating the turbo mode operation instruction once the air flow exceeds the predetermined air flow threshold.

14. The method of claim 1, further comprising:

monitoring a cryptocurrency price;

determining whether the cryptocurrency price exceeds a predetermined cryptocurrency price; and generating the turbo mode operation instruction once the cryptocurrency price exceeds the predetermined cryptocurrency price.

15. The method of claim 1, further comprising:

monitoring a utility price from an adjacent utility provider, wherein the adjacent utility provider is configured to provide power to the load through the power supply;

determining whether the utility price drops below a predetermined utility price; and generating the turbo mode operation instruction once the utility price drops below the predetermined utility price.

16. A system comprising:

a power supply configured to provide power to a load, wherein the power supply comprises a non-isolated power factor correction device and an isolated dc/dc converter connected in cascade between a power source and the load; and a system control apparatus configured to control the power supply, wherein the system control apparatus is configured to:

generate a turbo mode operation instruction based on a plurality of operating conditions;

based on the turbo mode operation instruction, adjust a system limit of the power supply so as to provide excess power to the load;

detect at least one operating parameter to obtain a detected operating parameter;

determine whether the detected operating parameter exceeds a predetermined threshold; and reduce the system limit of the power supply so that the detected operating parameter drops below the predetermined threshold.

17. The system of claim 16, wherein:

the load comprises a crypto mining machine.

18. The system of claim 17, wherein the non-isolated power factor correction device is a boost converter, and the isolated dc/dc converter is a full-bridge converter, and wherein:

the boost converter comprises an input capacitor, an inductor, a switch, a diode and an output capacitor, and wherein:

the input capacitor is coupled between a first input and a second input of the boost converter;

a first terminal of the inductor is coupled to the first input of the boost converter;

a second terminal of the inductor is coupled to an anode of the diode;

the switch is coupled between a common node of the inductor and the diode, and the second input of the boost converter; and the output capacitor is coupled between a cathode of the diode and the second input of the boost converter;

a primary side circuit of the full-bridge converter comprises a first switch, a second switch, a third switch and a fourth switch, and wherein:

the first switch and the second switch are connected in series between a first input and a second input of the full-bridge converter, and wherein a common node of the first switch and the second switch is connected to a first terminal of a primary winding of a transformer of the full-bridge converter;

the third switch and the fourth switch are connected in series between the first input and the second input of the full-bridge converter, and wherein a common node of the third switch and the fourth switch is connected to a second terminal of the primary winding of the transformer of the full-bridge converter; and a secondary side circuit of the full-bridge converter comprises a rectifier and a filter connected in cascade between a secondary winding of the transformer of the full-bridge converter and an output of the full-bridge converter.

19. The system of claim 16, wherein:

the system limit is a predetermined current limit, and wherein the predetermined current limit is dynamically adjustable in response to the turbo mode operation instruction and the detected operating parameter.

20. A method comprising:

generating a turbo mode operation instruction based on a plurality of operating conditions;

based on the turbo mode operation instruction, adjusting a system limit of a power supply so as to provide excess power to a load coupled to the power supply, wherein the load comprises an artificial intelligence processor;

detecting at least one operating parameter to obtain a detected operating parameter;

determining whether the detected operating parameter exceeds a predetermined threshold; and reducing power consumption of the load through reducing an operating frequency of a processor so that the detected operating parameter drops below the predetermined threshold.

21. The method of claim 20, wherein:

the system limit is a predetermined current limit; and the at least one operating parameter is a system temperature.

22. The method of claim 20, wherein:

the power supply comprises a non-isolated power factor correction device and an isolated dc/dc converter connected in cascade between a power source and the load.

* * * * *